US011176622B2

(12) United States Patent
Rai et al.

(10) Patent No.: US 11,176,622 B2
(45) Date of Patent: Nov. 16, 2021

(54) CONTENT SIMILARITY DETERMINATION SYSTEM AND METHOD

(71) Applicant: Woofy, Inc., New York, NY (US)

(72) Inventors: Arjun Rai, New York, NY (US); Michal Lyskawinski, Secaucus, NJ (US)

(73) Assignee: Woofy, Inc., New York, NY (US)

( * ) Notice: Subject to any disclaimer, the term of this patent is extended or adjusted under 35 U.S.C. 154(b) by 222 days.

(21) Appl. No.: 16/684,116

(22) Filed: Nov. 14, 2019

(65) Prior Publication Data

US 2021/0150633 A1   May 20, 2021

(51) Int. Cl.
| | |
|---|---|
| *G06Q 10/00* | (2012.01) |
| *G06Q 50/00* | (2012.01) |
| *H04L 12/58* | (2006.01) |
| *G06F 16/958* | (2019.01) |
| *G06K 9/62* | (2006.01) |

(52) U.S. Cl.
CPC ........... *G06Q 50/01* (2013.01); *G06F 16/958* (2019.01); *G06K 9/6215* (2013.01); *H04L 51/32* (2013.01)

(58) Field of Classification Search
CPC ....... G06Q 50/01; H04L 51/32; G06F 16/958; G06K 9/6215
See application file for complete search history.

(56) References Cited

U.S. PATENT DOCUMENTS

| | | | | |
|---|---|---|---|---|
| 9,832,163 | B1 * | 11/2017 | Biehn | H04L 51/14 |
| 10,680,841 | B1 * | 6/2020 | Kalluri | H04L 12/185 |
| 10,684,738 | B1 * | 6/2020 | Sicora | G06F 16/435 |
| 2012/0284340 | A1 * | 11/2012 | Young | G06F 16/951 |
| | | | | 709/204 |
| 2013/0055128 | A1 * | 2/2013 | Muti | G06Q 50/01 |
| | | | | 715/769 |
| 2014/0101145 | A1 * | 4/2014 | Alonso | G06F 16/313 |
| | | | | 707/728 |
| 2015/0227967 | A1 * | 8/2015 | Knight | G06Q 30/0246 |
| | | | | 705/14.45 |
| 2015/0317688 | A1 * | 11/2015 | Bhamidipati | G06Q 30/0269 |
| | | | | 705/14.66 |

(Continued)

OTHER PUBLICATIONS

The Tweet, and the Do-Over: [Question] Biersdorfer, J D. New York Times, Late Edition (East Coast) [New York, N.Y] Dec. 15, 2016: B.8. (Year: 2016).*

*Primary Examiner* — Gabrielle A McCormick
(74) *Attorney, Agent, or Firm* — Fresh IP PLC; John R. Bednarz

(57) ABSTRACT

A system includes a memory and at least one processor to compare content in a draft social media post with a library of social media posts and determine a similarity score for the draft social media post, the library of social media posts comprising social media posts that have published in a previous sixty day period and social media posts that are scheduled to publish in a next sixty day period, determine whether the similarity score is less than a maximum allowable similarity score, send a notification that indicates that the similarity score is one of greater than or equal to the maximum allowable similarity score and less than the maximum allowable similarity score, add the draft social media post to the library of social media posts when the similarity score is less than the maximum allowable similarity score, and publish the draft social media post.

20 Claims, 10 Drawing Sheets

(56) References Cited

U.S. PATENT DOCUMENTS

| | | | |
|---|---|---|---|
| 2015/0350117 A1* | 12/2015 | Bastide | H04L 51/02 |
| | | | 715/752 |
| 2016/0104069 A1* | 4/2016 | Garg | H04L 51/12 |
| | | | 706/11 |
| 2016/0197870 A1* | 7/2016 | Liu | H04L 12/1822 |
| | | | 709/206 |
| 2018/0315084 A1* | 11/2018 | Savage | G06Q 50/01 |
| 2019/0026786 A1* | 1/2019 | Khoury | G06Q 30/0271 |
| 2019/0149501 A1* | 5/2019 | Bastide | H04L 51/16 |
| | | | 709/206 |
| 2019/0279231 A1* | 9/2019 | Ning | G06Q 30/0202 |
| 2021/0081459 A1* | 3/2021 | Chung | G06F 16/9038 |

\* cited by examiner

CONTENT SIMILARITY DETERMINATION SYSTEM AND METHOD

BACKGROUND

Companies and businesses use social media platforms to market their products and services. Although the social media networks provide the ability to reach customers throughout the world, it can be incredibly difficult to determine when, how, and what to post. In particular, social media marketers may have to determine what to post in a variety of different languages and determine creative ways to engage potential customers. Even further complicating matters, certain social media platforms have strict rules about similarity between posts and may restrict users from posting duplicated content and/or similar posts. In certain circumstances, a user account may be suspended or even terminated if the user posts content that is overly similar Very large companies may have an entire marketing team that can handle this task. However, this is a time consuming task and for a small business, there simply may not be enough time to determine when, how, and what to post. In addition, for a global marketer that has to create posts in English when English is not their first language, this may be nearly impossible.

It is with these issues in mind, among others, that various aspects of the disclosure were conceived.

SUMMARY

According to one aspect, a system for determining content similarity receives content associated with a draft social media post from a client computing device. The system may include at least one server computing device having a content compliance engine that parses the content associated with the draft social media post and determines whether the content is similar to each social media post of a library of social media posts. The library of social media posts may be social media posts that are associated with at least one social media platform. In one example, the client computing device may have access to the at least one social media platform and at least one account for each of the at least one social media platform. The library of social media posts may include social media posts that have been published over a previous period of time and social media posts that are scheduled to be published for a future period of time. The content compliance engine may determine that the content associated with the draft social media post is too similar to at least one post in the library of social media posts and request that the draft social media post be modified and/or confirm that the draft social media post should be published even though it has been determined that the content is similar to at least one post in the library of social media posts.

According to an aspect, a system includes a memory and at least one processor to compare content in a draft social media post with a library of social media posts and determine a similarity score for the draft social media post, the library of social media posts comprising social media posts that have published in a previous sixty day period and social media posts that are scheduled to publish in a next sixty day period, determine whether the similarity score is less than a maximum allowable similarity score, send a notification that indicates that the similarity score is one of greater than or equal to the maximum allowable similarity score and less than the maximum allowable similarity score, add the draft social media post to the library of social media posts when the similarity score is less than the maximum allowable similarity score, and publish the draft social media post to at least one social media platform when the similarity score is less than the maximum allowable similarity score.

According to another aspect, a method includes comparing, by at least one processor, content in a draft social media post with a library of social media posts and determining a similarity score for the draft social media post, the library of social media posts comprising social media posts that have published in a previous sixty day period and social media posts that are scheduled to publish in a next sixty day period, determining, by the at least one processor, whether the similarity score is less than a maximum allowable similarity score, sending, by the at least one processor, a notification that indicates that the similarity score is one of greater than or equal to the maximum allowable similarity score and less than the maximum allowable similarity score, adding, by the at least one processor, the draft social media post to the library of social media posts when the similarity score is less than the maximum allowable similarity score, and publishing, by the at least one processor, the draft social media post to at least one social media platform when the similarity score is less than the maximum allowable similarity score According to an additional aspect, a non-transitory computer-readable storage medium includes instructions stored thereon that, when executed by a computing device cause the computing device to perform operations, the operations including comparing content in a draft social media post with a library of social media posts and determining a similarity score for the draft social media post, the library of social media posts comprising social media posts that have published in a previous sixty day period and social media posts that are scheduled to publish in a next sixty day period, determining whether the similarity score is less than a maximum allowable similarity score, sending a notification that indicates that the similarity score is one of greater than or equal to the maximum allowable similarity score and less than the maximum allowable similarity score, adding the draft social media post to the library of social media posts when the similarity score is less than the maximum allowable similarity score, and publishing the draft social media post to at least one social media platform when the similarity score is less than the maximum allowable similarity score.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
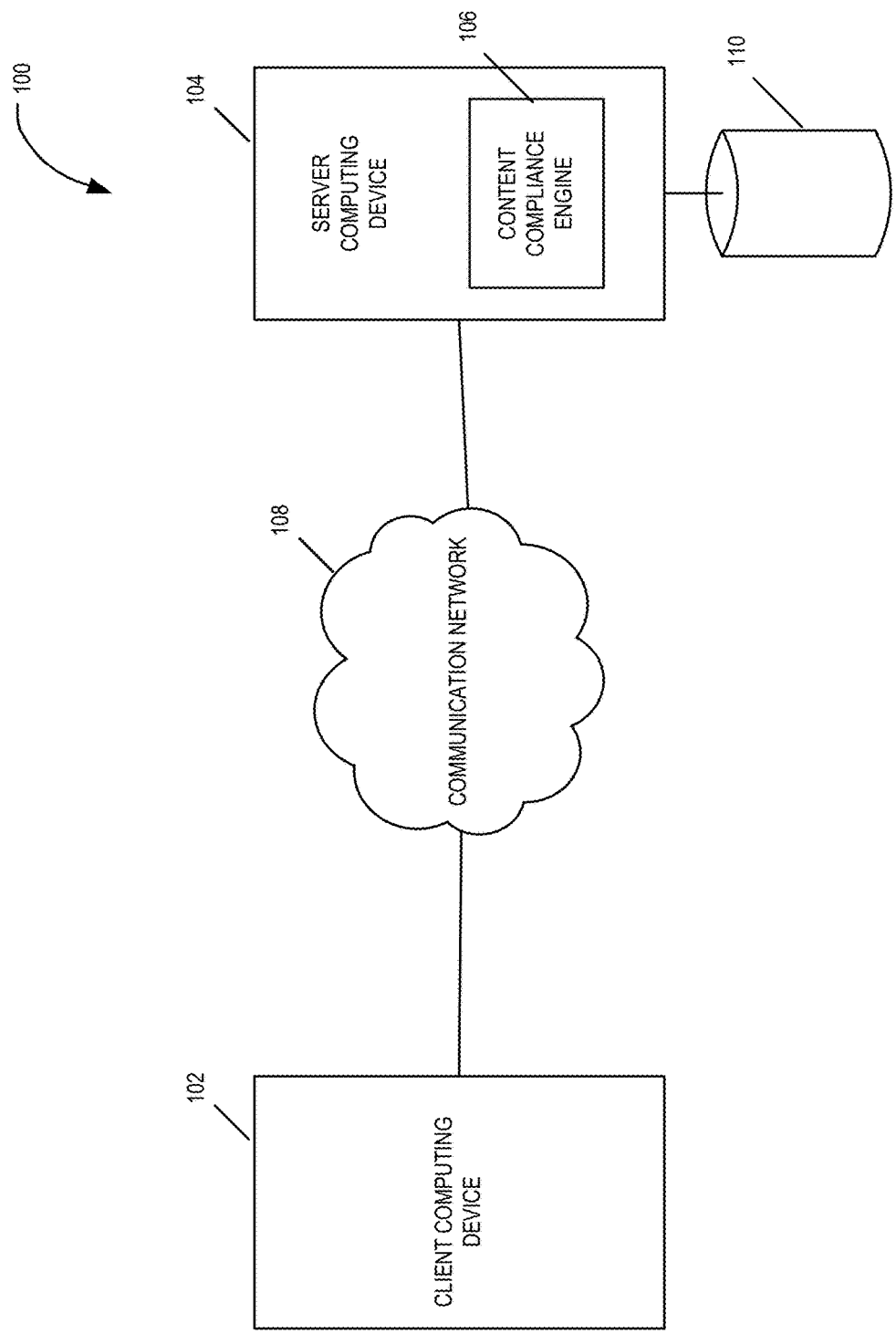
FIG. 1 is a block diagram of a system for determining content similarity according to an example embodiment.

Aspects of a system and method for determining content similarity includes at least one server computing device having a content compliance engine that parses content associated with a draft social media post from a client computing device and determines whether the content is similar to each social media post of a library of social media posts. The library of social media posts may be social media posts that are associated with at least one social media platform. In one example, the client computing device may have access to the at least one social media platform and at least one account for each social media platform of the at least one social media platform. The library of social media posts may include social media posts that have been published over a previous period of time and social media posts that are scheduled to be published for a future period of time. The content compliance engine may determine that the content associated with the draft social media post is too similar to at least one post in the library of social media posts and request that the draft social media post be modified and/or confirm that the draft social media post should be published even though it has been determined that the content is similar to at least one post in the library of social media posts.

Social media platforms, websites, and networks provide a way for businesses and individuals to promote products and services. In many cases, the businesses and individuals may use the social media networks at very low cost, often free. As an example, a business may have a team of marketers that are tasked with social media marketing. However, in other cases, a small business may include a very small number of employees or workers, e.g., one worker, which develops and sells a product or service and is also tasked with marketing the product or service. It may be difficult for the small business to compete with a large team of marketers that are tasked with social media marketing.

In many cases, it may be desirable to publish similar messages and social media posts on multiple social media networks simultaneously and/or contemporaneously. The small business may wish to publish one or more social media posts that are related to a same or similar topic or subject over a particular period of time and the small business may wish to reuse the one or more social media posts to create a marketing campaign to blast out similar or related content over a period of time. However, social media platforms and networks do not allow users to simultaneously post identical or substantially similar content to the same account or multiple accounts. In addition, the social media platforms and networks do not permit automation such as scheduling to post identical or substantially similar content. The social media platforms and networks have deemed such social media posts as spam and have blocked and/or suspended accounts that publish identical or substantially similar content.

The social media platforms and networks may authorize another application and/or server computing device to access the social media platforms and networks on their behalf. As an example, the application and/or server computing device may have access using OAuth. OAuth is a protocol for authorization and allows a third-party application to obtain limited access to a Hypertext Transfer Protocol (HTTP) service on behalf of a resource owner by allowing an approval interaction between the resource owner and the HTTP service or by allowing the third-party application to have access on its own. As an example, OAuth allows a user to grant a third-party website or web service access to another website or web service without providing a password. As an example, the user may provide their username or handle and OAuth may grant access. As a result, a social media network such as TWITTER or FACEBOOK may permit a user to share information about their account with a third party application or website. The system for determining content similarity may use OAuth or another protocol for authorization to allow access to one or more social media platforms and/or accounts.

The system may include a memory and at least one processor to compare content in a draft social media post with a library of social media posts and determine a similarity score for the draft social media post, the library of social media posts comprising social media posts that have published in a previous sixty day period and social media posts that are scheduled to publish in a next sixty day period, determine whether the similarity score is less than a maximum allowable similarity score, send a notification that indicates that the similarity score is one of greater than or equal to the maximum allowable similarity score and less than the maximum allowable similarity score, add the draft social media post to the library of social media posts when the similarity score is less than the maximum allowable similarity score, and publish the draft social media post to at least one social media platform when the similarity score is less than the maximum allowable similarity score.

FIG. 1 shows a block diagram of a computing system comprising a content similarity determination system 100 according to an example embodiment. The content similarity determination system 100 includes at least one client device 102 that is in communication with at least one server computing device 104 via a communication network 108. The at least one server computing device 104 may have an application or at least one component of an application shown as a content compliance engine 106.

The at least one client computing device 102 is configured to receive data from and/or transmit data to the at least one server computing device 104 through the communication network 108. Although the at least one client device 102 is shown as a single computing device, it is contemplated that the at least one client computing device 102 may include multiple computing devices.

The communication network 108 can be the Internet, an intranet, or another wired or wireless communication network. For example, the communication network 108 may include a Mobile Communications (GSM) network, a code division multiple access (CDMA) network, 3$^{rd}$ Generation Partnership Project (GPP) network, an Internet Protocol (IP) network, a wireless application protocol (WAP) network, a WiFi network, a Bluetooth network, a satellite communications network, or an IEEE 802.11 standards network, as well as various communications thereof. Other conventional and/or later developed wired and wireless networks may also be used.

The at least one client computing device 102 includes at least one processor to process data and memory to store data. The processor processes communications, builds communications, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions such as a portion or component of the content compliance engine 106. In addition, the at least one client computing device 102 further includes at least one communications interface to transmit and receive communications, messages, and/or signals.

The at least one server computing device 104 includes at least one processor to process data and memory to store data. The processor processes communications, builds communications, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions such as a portion or a component of the content compliance engine 106. In addition, the at least one server computing device 104 further includes at least one communications interface to transmit and receive communications, messages, and/or signals.

The at least one client computing device 102 can be a laptop computer, a smartphone, a personal digital assistant, a tablet computer, a standard personal computer, or another processing device. The at least one client computing device 102 may include a display, such as a computer monitor, for displaying data and/or graphical user interfaces. The at least one client computing device 102 may also include a Global Positioning System (GPS) hardware device for determining a particular location of the client computing device 102, an input device, such as a camera, a keyboard or a pointing device (e.g., a mouse, trackball, pen, or touch screen) to enter data into or interact with graphical and/or other types of user interfaces. In an exemplary embodiment, the display and the input device may be incorporated together as a touch screen of the smartphone or tablet computer.

The at least one client computing device 102 may display on the display a graphical user interface (or GUI). The graphical user interface may be provided by the content compliance engine 106. The graphical user interface enables a user of the at least one client computing device 102 to interact with the content compliance engine 106 and create a draft social media post that includes text and content that may include one or more words, one or more hashtags, one or more emojis, one or more quotations, and one or more images, among other content. The text may include one or more uniform resource locators (URLs). The user of the at least one client computing device 102 may create the draft social media post and the content compliance engine 106 may determine whether the draft social media post is too similar or overly similar to at least one other social media post in a library of social media posts. The user may receive a warning or notification that indicates whether the draft social media post is greater than a maximum similarity and the user may be given the opportunity to modify the draft social media post. When the draft social media post is not too similar to at least one other social media post, the user may save the draft social media post and the draft social media post may be published to at least one social media account associated with at least one social media platform. In certain instances, even if the draft social media post is similar to at least one other social media post, the user may save the draft social media post and the draft social media post may be published to at least one social media account associated with at least one social media platform. In another example, the user may save the draft social media post to be scheduled to publish to the at least one social media account associated with at least one social media platform.

The content compliance engine 106 may be a component of an application and/or service executable by the at least one server computing device 104. For example, the content compliance engine 106 may be a single unit of deployable executable code or a plurality of units of deployable executable code. According to one aspect, the content compliance engine 106 may include one component that may be a web application, a native application, and/or a mobile application (e.g., an app) downloaded from a digital distribution application platform that allows users to browse and download applications developed with mobile software development kits (SDKs) including the App Store and GOOGLE PLAY®, among others.

The content similarity determination system 100 may also include a relational database management system (RDBMS) or another type of database management system such as a NoSQL database system that stores and communicates data from at least one database 110. The data stored in the at least one database 110 may be associated with a library of social media posts. The library of social media posts may include one or more of a plurality of draft social media posts, a number of social media posts that have been published in a previous time period, and a number of social media posts that have been scheduled to publish in a future time period. In one example, the previous time period may be sixty days and the future time period may be sixty days. As an example, the database 110 may include one or more tables or data structures that may be organized to store the information associated with the database 110.

Figure 2:
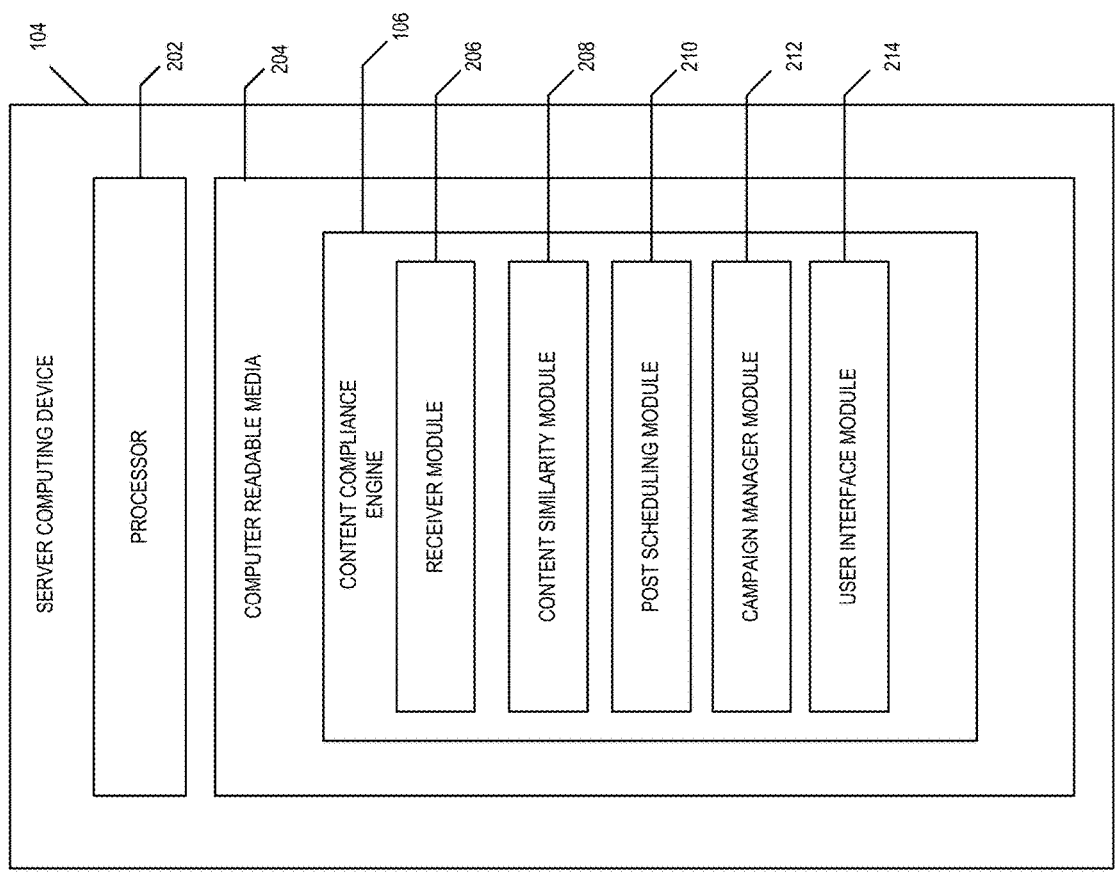
FIG. 2 shows a block diagram of a server computing device of the system according to an example embodiment.

FIG. 2 illustrates a block diagram of the server computing device 104 according to an example embodiment. The server computing device 104 includes at least one processor 202 and computer readable media (CRM) 204 in memory on which the content compliance engine 106 or other user interface or application is stored. The computer readable media 204 may include volatile media, nonvolatile media, removable media, non-removable media, and/or another available medium that can be accessed by the processor. By way of example and not limitation, the computer readable media comprises computer storage media and communication media. Computer storage media includes non-transitory storage memory, volatile media, nonvolatile media, removable media, and/or non-removable media implemented in a method or technology for storage of information, such as computer/machine-readable/executable instructions, data structures, program modules, or other data. Communication media may embody computer/machine-readable/executable instructions, data structures, program modules, or other data and include an information delivery media or system, both of which are hardware.

The content compliance engine 106 may include a receiver module 206 for receiving a draft social media post from the client computing device 102. The receiver module 206 may receive the draft social media post from the client computing device 102 one character at a time in real-time. The receiver module 206 may receive each character of text and determine a Unicode value for each value of text as it is received.

In order to publish the draft social media post to a social media account, a user of the client computing device 102 is requested to provide a social media handle or username for at least one social media network and a password for the at least one social media network. The server computing device 104 may receive the username and the password and may send a representation of the username and password to a server computing device associated with the at least one social media network to confirm that the username and password are correct and valid. As noted above, the server computing device 104 may use OAuth or another form of authorization. The user may associate a number of social media usernames and passwords with the server computing device 104 for a number of social media platforms and accounts including, but not limited to, FACEBOOK, TWITTER, LINKEDIN, and INSTAGRAM.

When creating the draft social media post, the user of the client computing device 102 may be asked to provide a category to categorize the draft social media post. As an example, the category may be "Tips", "My Blog Posts", "Inspirational Quotes", "Post Once", "Tips and Tricks", and "Funny", among others. In addition, the user may create a new category and save the draft social media post under the new category.

The content compliance engine 106 may include a content similarity module 208 for determining a similarity score for the draft social media post from the client computing device 102. As each character of the draft social media post is received, the content similarity module 208 compares content in the draft social media post with a library of social media posts and determines a similarity score for the draft social media post. As an example, the library of social media posts may include draft social media posts and social media posts that have published in a previous sixty day period and social media posts that are scheduled to publish in a next sixty day period.

The content similarity module 208 may send a notification or indication to the client computing device 102 that indicates that the content similarity module 208 is in the process of determining content similarity. As an example, the indication may be a repeating animation such as a set of three dots that move from left to right in a wave-like movement. Another indication also may be used. The similarity score may be determined by converting the draft social media post to a string of text and comparing the string of text with a string of text for each social media post in the library of social media posts and determining a percentage of similarity for each social media post in the library of social media posts.

The content similarity module 208 may determine whether the similarity score is less than a maximum allowable similarity score and send a notification that indicates that the similarity score is one of greater than or equal to the maximum allowable similarity score and less than the maximum allowable similarity score. In one example, a particular social media platform may have an associated maximum allowable similarity score, e.g., 85% similarity or 100% similarity. The maximum allowable similarity score may be another value. In another example, the similarity score may be a decimal such as 0.85 or 1.0. In another example, the similarity score may be a fractional value such as ⁸⁄₁₀ or ⅘. In another example, the similarity score may be a number of stars, e.g., four stars out of five stars. As an example, a first social media platform such as TWITTER may have a maximum allowable similarity score of 85%. However, a second social media platform such as FACEBOOK may have a maximum allowable similarity score of 100%.

The content similarity module 208 may notify and/or warn the user that the draft social media post is similar to at least one recent social media post or a social media post that is scheduled to publish soon. In one example, the content similarity module 208 may decline adding the draft social media post to the library of social media posts when the similarity score is greater than the maximum allowable similarity score, e.g., 85% or 100%. The server computing device 104 may request that the user provide a modification to the content in the draft social media post from the client computing device 102. After the receiver module 206 receives the modification, the content similarity module 208 may compare the content in the draft social media post with each social media post in the library of social media posts and determine that the similarity score for the draft social media post is less than the maximum allowable similarity score. At this time, the server computing device 104 may add the draft social media post to the library of social media posts, and publish the draft social media post to the at least one social media platform.

In another example, the content similarity module 208 may determine the content in the draft social media post is similar to at least one social media post in the library of social media posts that is one of scheduled to publish in a next twenty-four hour time period and has published in a previous twenty-four hour time period and decline adding the draft social media post to the library of social media posts. The server computing device 104 may request that the user provide a modification to the content in the draft social media post from a client computing device 102. After the receiver module 206 receives the modification, the content similarity module 208 may compare the content in the draft social media post with the library of social media posts and determine that the similarity score for the draft social media post is less than the maximum allowable similarity score. At this time, the server computing device 104 may add the draft social media post to the library of social media posts, and publish the draft social media post to the at least one social media platform.

In another example, the content similarity module 208 may determine the content in the draft social media post is similar to at least four social media posts in the library of social media posts that is one of published in a previous seven day period and scheduled to publish in a next seven day period and decline adding the draft social media post to the library of social media posts. The server computing device 104 may request that the user provide a modification to the content in the draft social media post from the client computing device 102. After the receiver module 206 receives the modification, the content similarity module 208 may compare the content in the draft social media post with each social media post in the library of social media posts and determine that the similarity score for the draft social media post is less than the maximum allowable similarity score. At this time, the server computing device 104 may add the draft social media post to the library of social media posts, and publish the draft social media post to the at least one social media platform.

Based on the above similarity checks and rules, the user may view rejected draft social media posts and pending draft social media posts that may be scheduled to publish at a future time.

The content compliance engine 106 may include a post scheduling module 210 for receiving the draft social media post with the similarity score. In one example, depending on the similarity score, the user of the client computing device 102 may schedule the draft social media post for immediate publication and/or may schedule the draft social media post to publish at a future time. The user of the client computing device 102 may schedule the draft social media post for publication for one or more social media platforms and accounts.

The post scheduling module 210 may allow the user to view the scheduled draft social media posts by month, by week, by day, in a timeline, or in a list. In addition, each scheduled draft social media post may be shown on the calendar in a particular color that indicates an associated social media network, platform, and/or account. As an example, a scheduled draft social media post may be scheduled to publish on a first social media platform at 8:30 P.M. on Wednesday. At that time, the draft social media post is published to the first social media platform. In addition, the user may schedule the draft social media post to publish on more than social media platform at 8:30 P.M. in a user's time zone or a particular time zone such as the first social media platform and a second social media platform.

The content compliance engine 106 may include a campaign manager module 212 for receiving the draft social media post with a similarity score that is less than the maximum allowable similarity score. In one example, the user of the client computing device 102 may design and create a social media campaign that may last a period of time, e.g., fourteen days, and includes one or more scheduled social media posts that may be associated with a related topic, subject, theme, or issue. In one example, the user of the client computing device 102 may create a name for the campaign, at least one social media account, a start date, an end date, a posting method (e.g., last in first out (LIFO) or first in first out (FIFO)), and a selected category of saved social media posts. The campaign manager module 212 may automatically schedule and create a campaign based on the saved social media posts.

As an example, the campaign may create one or more scheduled times for publishing a social media post. The user may be asked to select at least one social media post for each of the one or more scheduled times or at least some of the scheduled times. If there is not enough content added to the campaign, the user may be notified via a notification or warning that there is not enough content. The user may then add one or more social media posts to the campaign.

The user may be asked to fill the library of social media posts such that they may last the length of the campaign and the user may be encouraged to ensure that the social media posts are not overly similar to one another. This may include the comparison of each social media post of the campaign to the maximum allowable similarity score, checking that the content in the draft social media post is similar to at least one social media post in the library of social media posts that is one of scheduled to publish in a next twenty-four hour time period and has published in a previous twenty-four hour time period, and/or checking that the content in the draft social media post is similar to at least four social media posts in the library of social media posts that is one of published in a previous seven day period and scheduled to publish in a next seven day period.

In addition, the content compliance engine 106 includes a user interface module 214 for displaying the user interface on the display. As an example, the user interface module 214 generates a native and/or web-based graphical user interface (GUI) that accepts input and provides output viewed by a user of the client computing device 102. The client computing device 102 may provide realtime automatically and dynamically refreshed information such as the draft social media post and the associated similarity score, among information. The user interface module 214 may send data to other modules of the content compliance engine 106 of the server computing device 104, and retrieve data from other modules of the content compliance engine 106 of the server computing device 104 asynchronously without interfering with the display and behavior of the user interface displayed by the client computing device 102.

Figure 3:
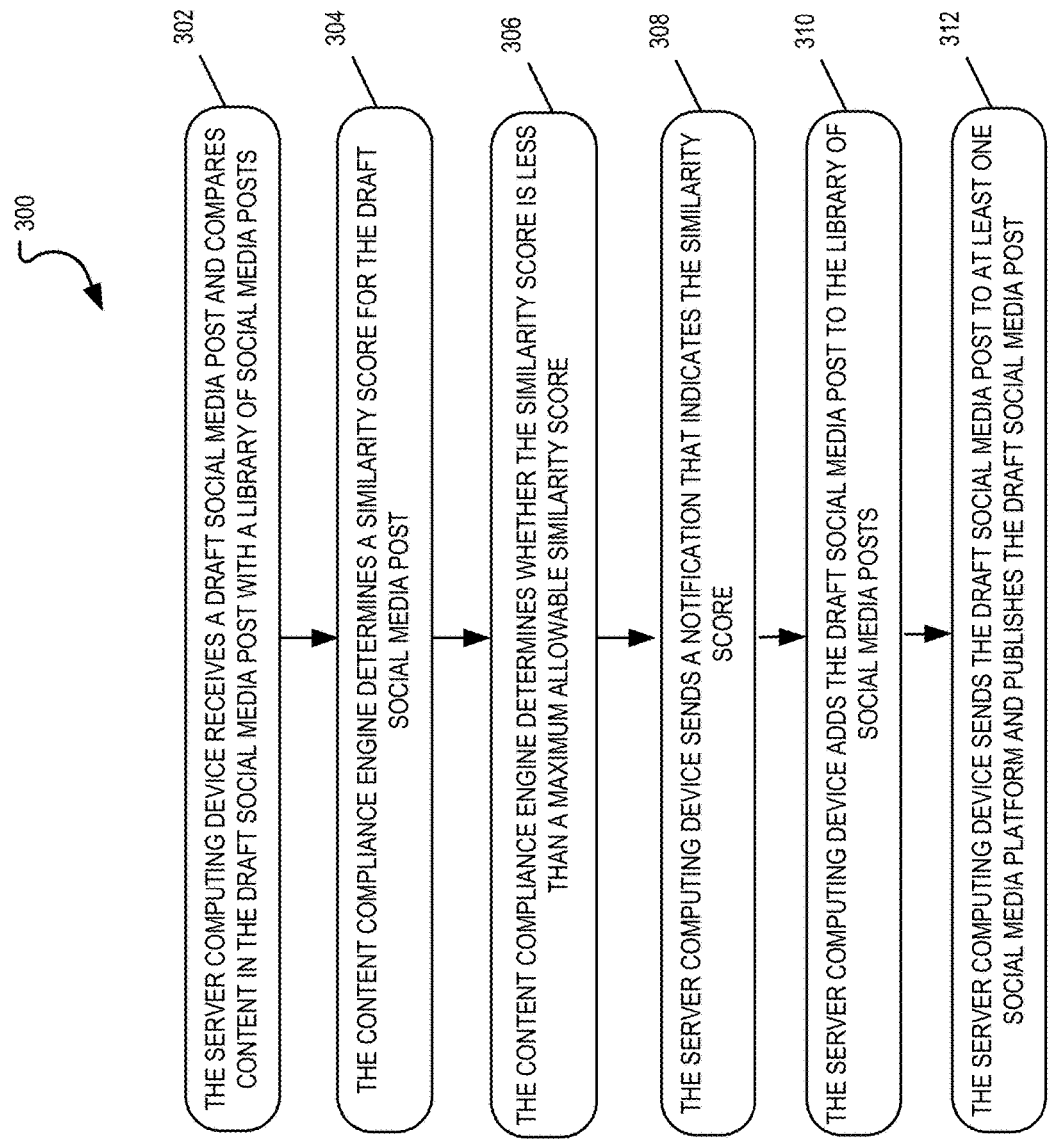
FIG. 3 illustrates a flowchart for determining content similarity according to an example embodiment.

FIG. 3 illustrates a flowchart of a process 300 for determining content similarity, according to an example embodiment. In step 302, the client computing device 102 receives input comprising a draft social media post from a user and sends the input as each character is received by the server computing device 104. The server computing device 104 receives the draft social media post from the client computing device 102 and the content compliance engine 106 compares content in the draft social media post with a library of social media posts. In step 304, the content compliance engine 106 determines a similarity score for the draft social media post. In one example, the library of social media posts includes social media posts that have published in a previous sixty day period and social media posts that are scheduled to publish in a next sixty day period. The library of social media posts may include social media posts that are associated with one or more social media accounts for one or more social media platforms including, but not limited to, TWITTER, FACEBOOK, LINKEDIN, and INSTAGRAM, among others.

In step 306, the content compliance engine 106 determines whether the similarity score is less than a maximum allowable similarity score. As an example, the maximum allowable similarity score may be 85% or 100%, among other scores.

In step 308, the server computing device 104 sends a notification or warning to the client computing device 102 that indicates information associated with the similarity score. As an example, the information may include that the similarity score is one of greater than or equal to the maximum allowable similarity score and less than the maximum allowable similarity score. As another example, the information may include that the similarity score is less than the maximum allowable similarity score.

The content compliance engine 106 may decline or disallow adding the draft social media post to the library of social media posts when the similarity score is greater than the maximum allowable similarity score. The server computing device 104 may request that the user of the client computing device 102 modify the draft social media post. The server computing device 104 may receive a modification to the content in the draft social media post from the client computing device 102 and compare the revised content in the draft social media post with the library of social media posts. At this point, the server computing device 104 may determine that the similarity score for the draft social media post is less than the maximum allowable similarity score.

As another example, the content compliance engine 106 may determine the content in the draft social media post is similar to at least one social media post in the library of social media posts that is one of scheduled to publish in a next twenty-four hour time period and has published in a previous twenty-four hour time period. The server computing device 104 may decline or disallow adding the draft social media post to the library of social media posts. The server computing device 104 may request that the user of the client computing device 102 modify the draft social media post. The server computing device 104 may receive a modification to the content in the draft social media post from the client computing device 102 and compare the revised content in the draft social media post with the library of social media posts. At this point, the server computing device 104 may determine that the similarity score for the draft social media post is less than the maximum allowable similarity score.

As another example, the content compliance engine 106 may determine the content in the draft social media post is similar to at least four social media posts in the library of social media posts that is one of published in a previous seven day period and scheduled to publish in a next seven day period. The server computing device 104 may decline or disallow adding the draft social media post to the library of social media posts. The server computing device 104 may request that the user of the client computing device 102 modify the draft social media post. The server computing device 104 may receive a modification to the content in the draft social media post from a client computing device and compare the revised content in the draft social media post with the library of social media posts. At this point, the server computing device 104 may determine that the similarity score for the draft social media post is less than the maximum allowable similarity score.

Additionally, the server computing device 104 may compare the content in the draft social media post with the library of social media posts that have published to a particular social media platform and determine a social media platform similarity score for the draft social media post. The social media platform similarity score may be relative to each particular social media platform. As an example, there may be a first social media platform similarity score for a first social media platform that is based on the social media posts in the first social media platform and a second social media platform similarity score for a second social media platform that is based on the social media posts in the second social media platform.

In step 310, the server computing device 104 may add the draft social media post to the library of social media posts when the similarity score is less than the maximum allowable similarity score. In some cases, the server computing device 104 may add the draft social media post to the library of social media posts when the similarity score is equal to or greater than the maximum allowable similarity score. Although the draft social media post may be too similar to a recent social media post or a social media post that is scheduled to publish, the server computing device may add the draft social media post to the library of social media posts when the user overrides a warning or notification. However, as noted herein, in some situations, the user may not be able to override a warning or notification associated with a draft social media post.

In step 312, the server computing device 104 may send the draft social media post to at least one social media platform and publish the draft social media post to the at least one social media platform when the similarity score is less than the maximum allowable similarity score. As an example, the server computing device 104 may publish the draft social media post for a first social media platform when the first social media platform similarity score is less than the maximum allowable similarity score for the first social media platform, e.g., 85%, and may publish the draft social media post for a second social media platform when the second social media platform similarity score is less than the maximum allowable similarity score for the second social media platform, e.g., 100%.

As an example, the content compliance engine 106 may send a graphical user interface (GUI) to the client computing device 102 and display the GUI on a display of the client computing device 102. The GUI may show the draft social media post, among other information. The client computing device 102 may display text associated with the draft social media post in a text box user interface element, display the list of hashtags in a hashtag user interface element, display the quotation in a quotation user interface element, and display the list of emojis in a emoji user interface element. In addition, the GUI may have a number that indicates a number of possible remaining characters for the post. The content compliance engine 106 may receive a selection of an add to library user interface element on the GUI and add the text to a post to be published using at least one social media platform.

Figure 4:
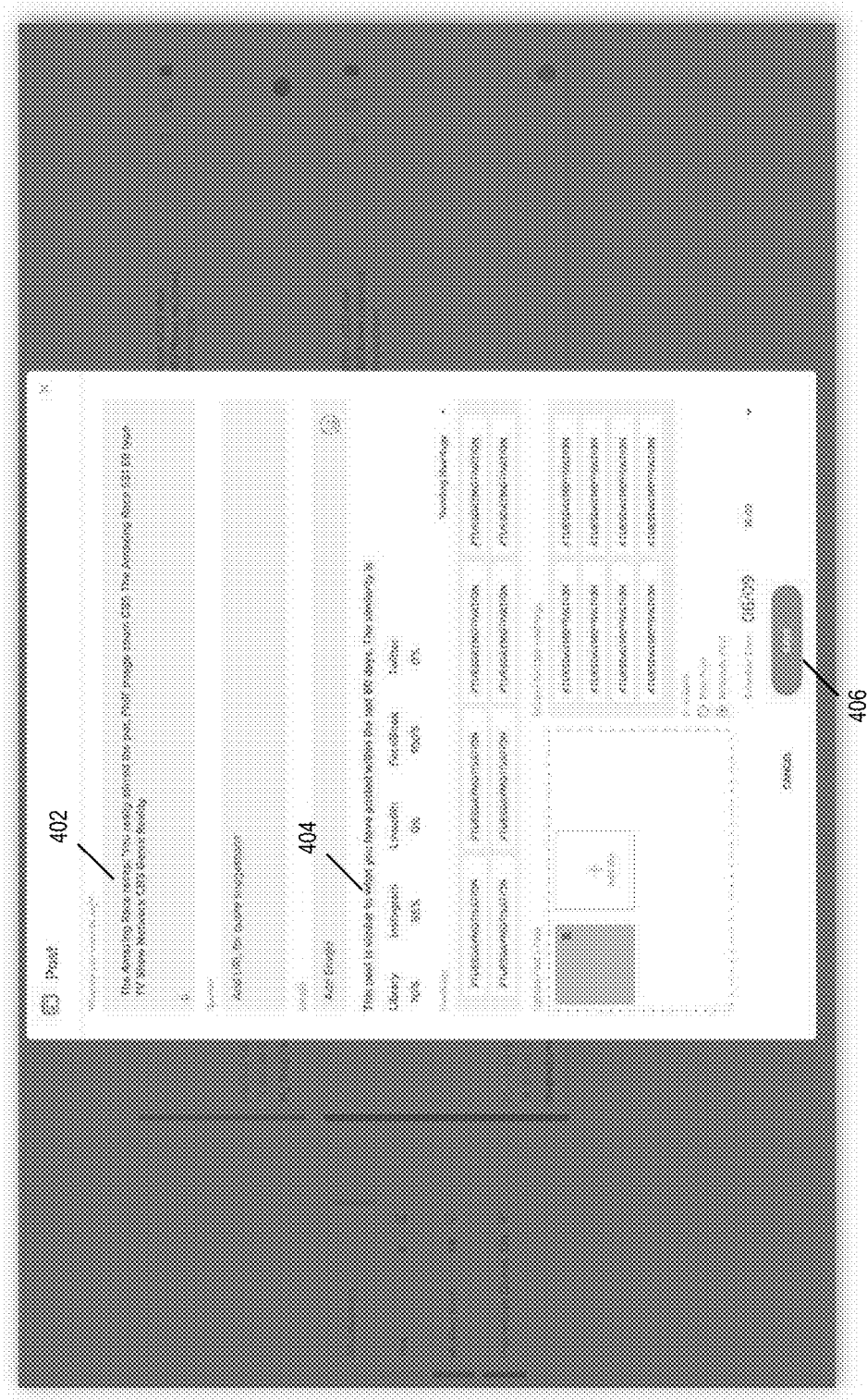
FIG. 4 illustrates an example user interface of an application displayed by a client computing device according to an example embodiment.

FIG. 4 shows an example user interface of the content compliance engine 106 displayed by the client computing device 102 according to an example embodiment. As shown in FIG. 4, the user of the client computing device 102 may provide input 402 including text in a text input user interface element. The input 402 is a draft social media post. As each character of the input 402 is received, the content compliance engine 106 compares the draft social media post with each social media post in the library of social media posts and determines a similarity score for the draft social media post. FIG. 4 shows that the user of the client computing device 102 may also use a quotes user interface element to add a quote to the draft social media post, an emojis user interface element to add one or more emojis to the draft social media post, a hashtags user interface element to add one or more hashtags to the draft social media post, and a files user interface element to add one or more files to the draft social media post. As an example, the files user interface element may be used to add one or more images to the draft social media post.

FIG. 4 shows an overall similarity score for the draft social media post for the entire library of social media posts, which is 70%, an INSTAGRAM similarity score of 55%, a LINKEDIN similarity score of 0%, a FACEBOOK similarity score of 100%, and a TWITTER similarity score of 0%. As shown in FIG. 4, each of the similarity scores is based on the library of social media posts that have been published within the last sixty days. The user may select the save user interface element 406 shown as a button to save the draft social media post. When the user selects the save user interface element 406, the draft social media post may be saved for later publishing. The draft social media post may be scheduled to be published to one or more social media platforms including, but not limited to, TWITTER, FACEBOOK, LINKEDIN, and INSTAGRAM.

Figure 5:
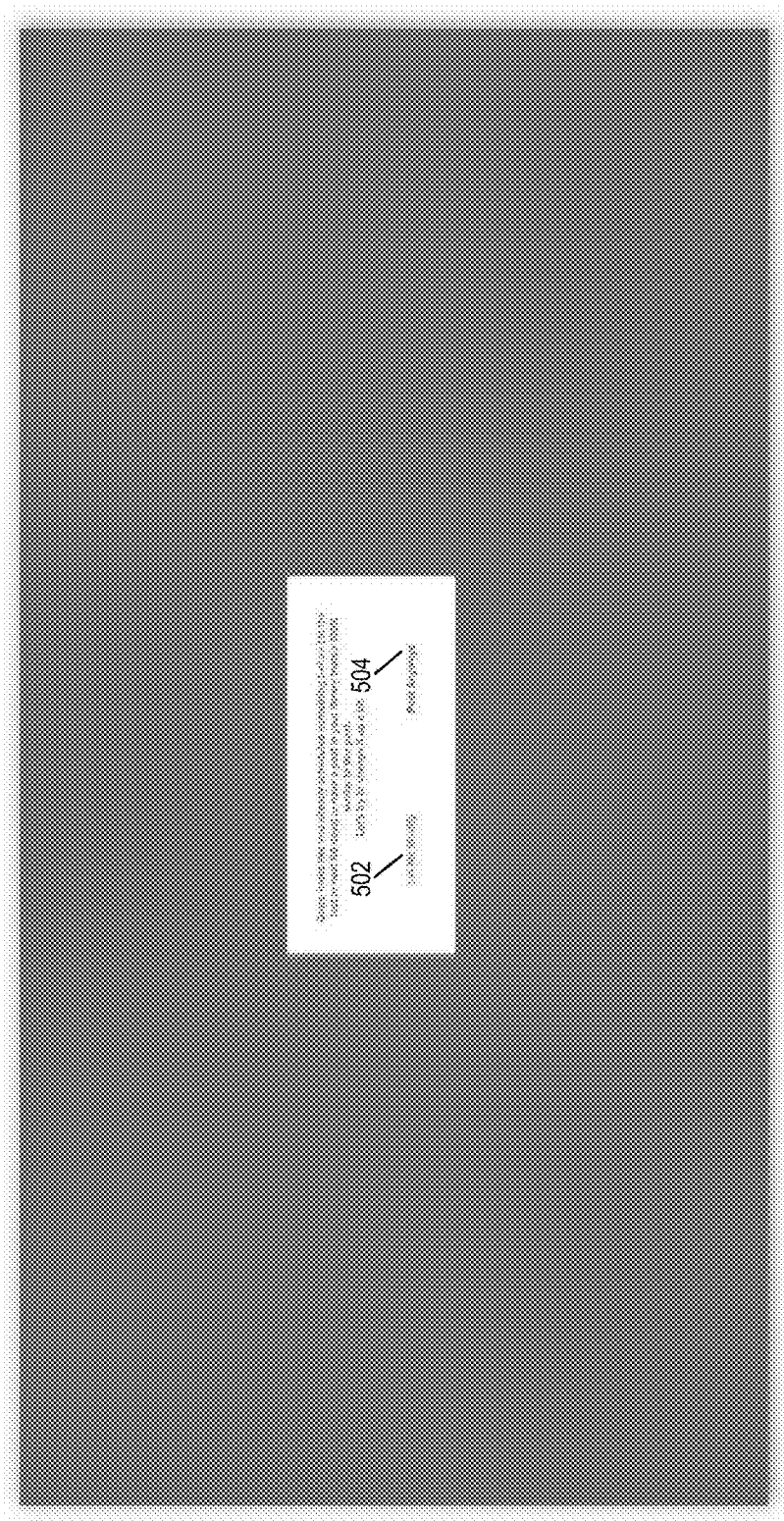
FIG. 5 illustrates an example user interface of the application displayed by the client computing device according to an example embodiment.

FIG. 5 shows an example user interface of the content compliance engine 106 displayed by the client computing device 102 according to an example embodiment. As shown in FIG. 5, the user of the client computing device 102 may provide the draft social media post and the content compliance engine 106 may compare the draft social media post with each social media post in the library of social media posts and determine a similarity score for the draft social media post.

As shown in FIG. 5, the similarity score is 100%. In this case, the content compliance engine 106 may provide a notification or warning such as a modal notification that provides the following: "Oops, looks like you already scheduled something before (in the last or next 60 days) or have a post in your library that's 100% similar to this post. Let's try to change it up a bit." The user may select a modification user interface element 502 that when selected allows the user to modify the draft social media post. Alternatively, the user may ignore the warning and select the publish user interface element 504 that when selected saves the draft social media post. The draft social media post may be published and/or scheduled to publish to one or more social media platforms using one or more social media accounts.

Figure 6:
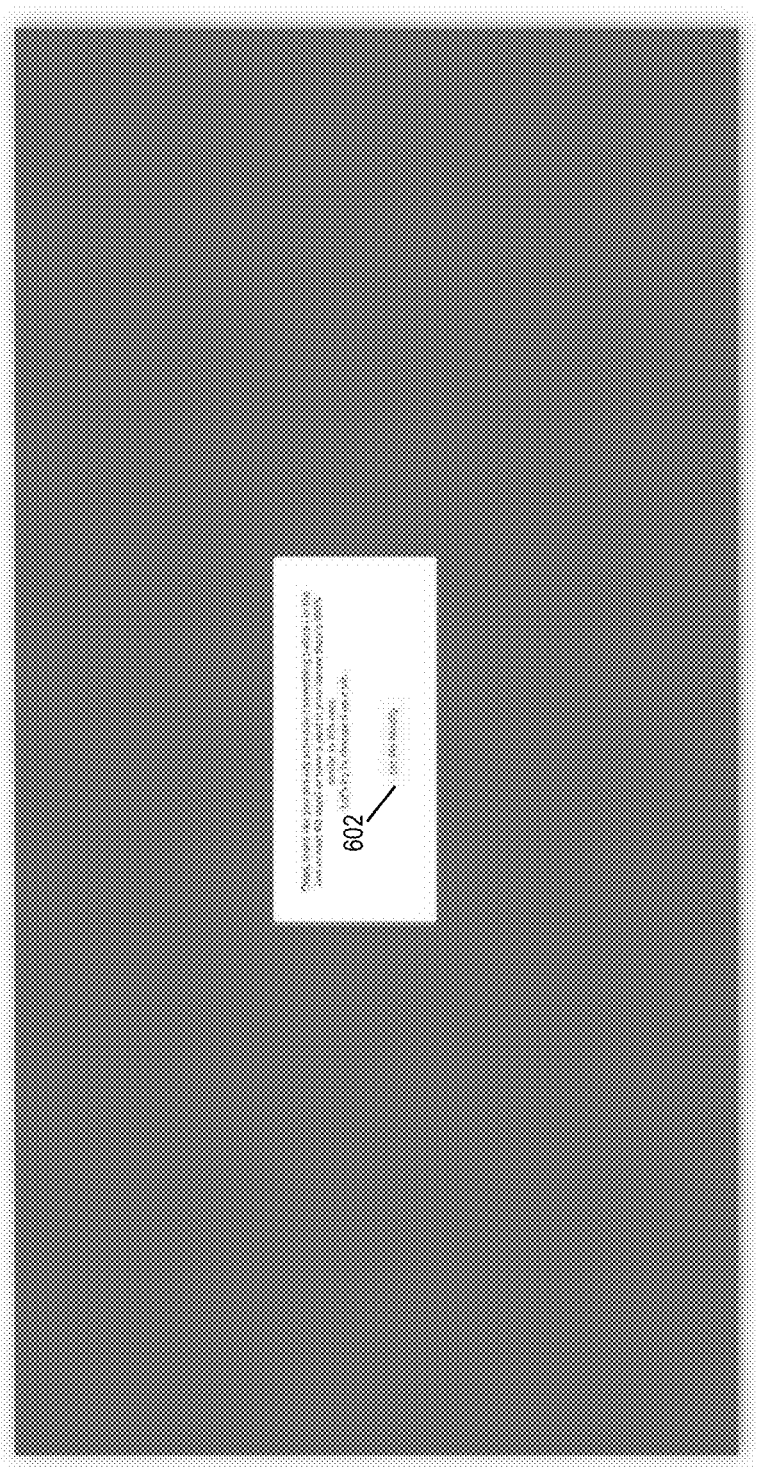
FIG. 6 illustrates an example user interface displayed by the client computing device according to an example embodiment.

FIG. 6 shows an example user interface of the content compliance engine 106 displayed by the client computing device 102 according to an example embodiment. As shown in FIG. 6, the user of the client computing device 102 may provide the draft social media post and the content compliance engine 106 may compare the draft social media post with each social media post in the library of social media posts and determine a similarity score for the draft social media post. As shown in FIG. 6, the similarity score is 100%. In this case, the content compliance engine may provide a notification or warning such as a modal notification that provides the following: "Oops, looks like you already scheduled something before (in the last or next 60 days) or have a post in your library that's 100% similar to this post. Let's try to change it up a bit." The user may select a modification user interface element 602 that when selected allows the user to modify the draft social media post. Unlike as shown in FIG. 5, the user may not ignore the warning. Until the draft social media post is modified and compared with the library of social media posts, the user may not publish the draft social media post to one or more social media platforms or accounts.

Figure 7:
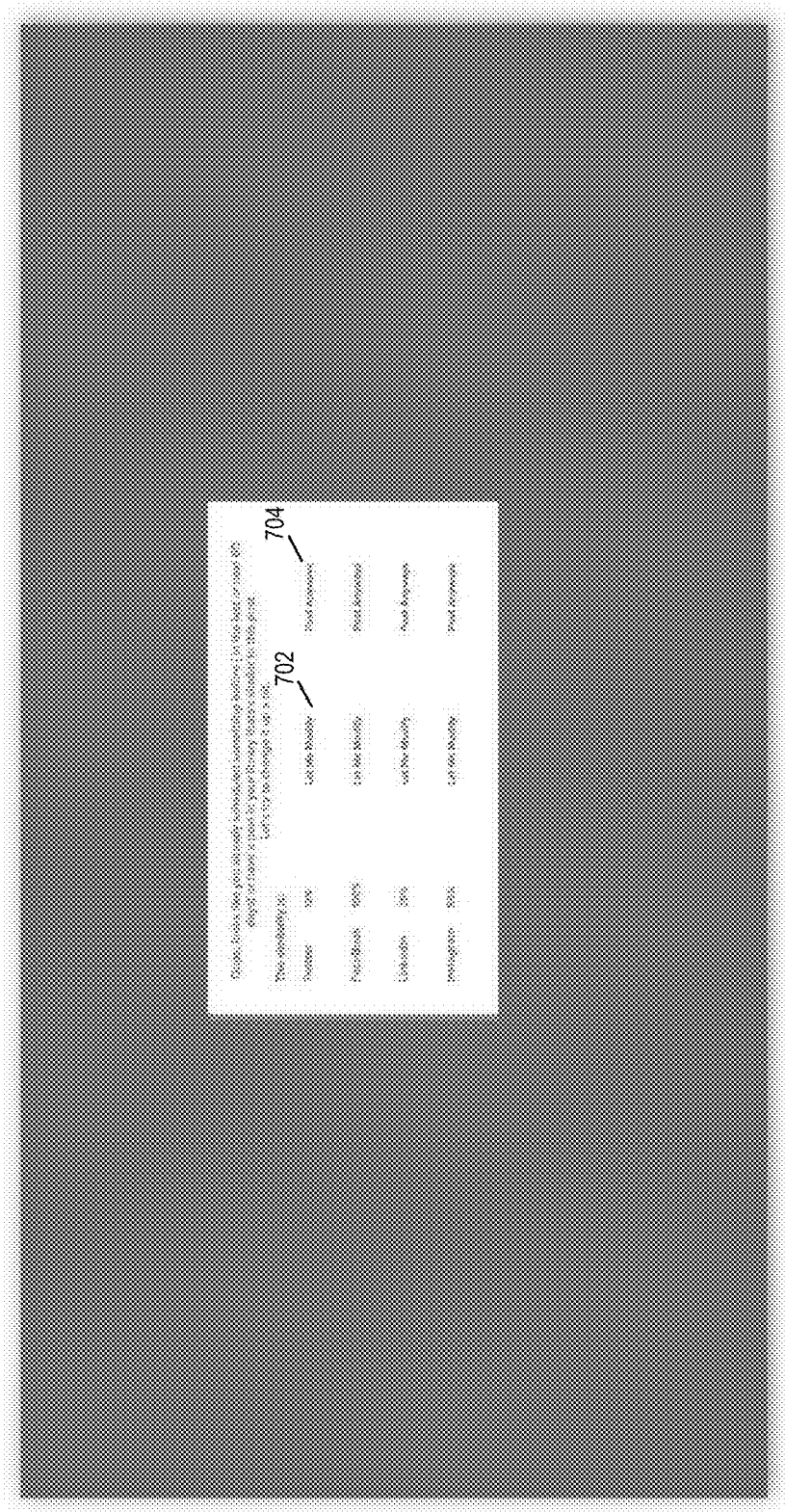
FIG. 7 illustrates an example user interface displayed by the client computing device according to an example embodiment.

FIG. 7 shows an example user interface of the content compliance engine 106 displayed by the client computing device 102 according to an example embodiment. As shown in FIG. 7, the user of the client computing device 102 may provide the draft social media post and the content compliance engine 106 may compare the draft social media post with each social media post in the library of social media posts and determine a similarity score for the draft social media post. As shown in FIG. 7, the content compliance engine 106 may provide a similarity score for one or more social media platforms and each social media account associated with the content compliance engine 106. As shown in FIG. 7, the similarity score for a first social media platform and account, TWITTER, is 12%. The similarity score for a second social media platform and account, FACEBOOK, is 100%. The similarity score for a third social media platform and account, LINKEDIN, is 26%. The similarity score for a fourth social media platform and account, INSTAGRAM, is 55%. For each social media platform, the user of the client computing device 102 may modify the draft social media post. As an example, the user may select a modification user interface element 702 that when selected allows the user to modify the draft social media post. Alternatively, the user may ignore the warning and select the publish user interface element 704 that when selected saves the draft social media post. The draft social media post may be published and/or scheduled to publish to the associated social media platform and account.

Figure 8:
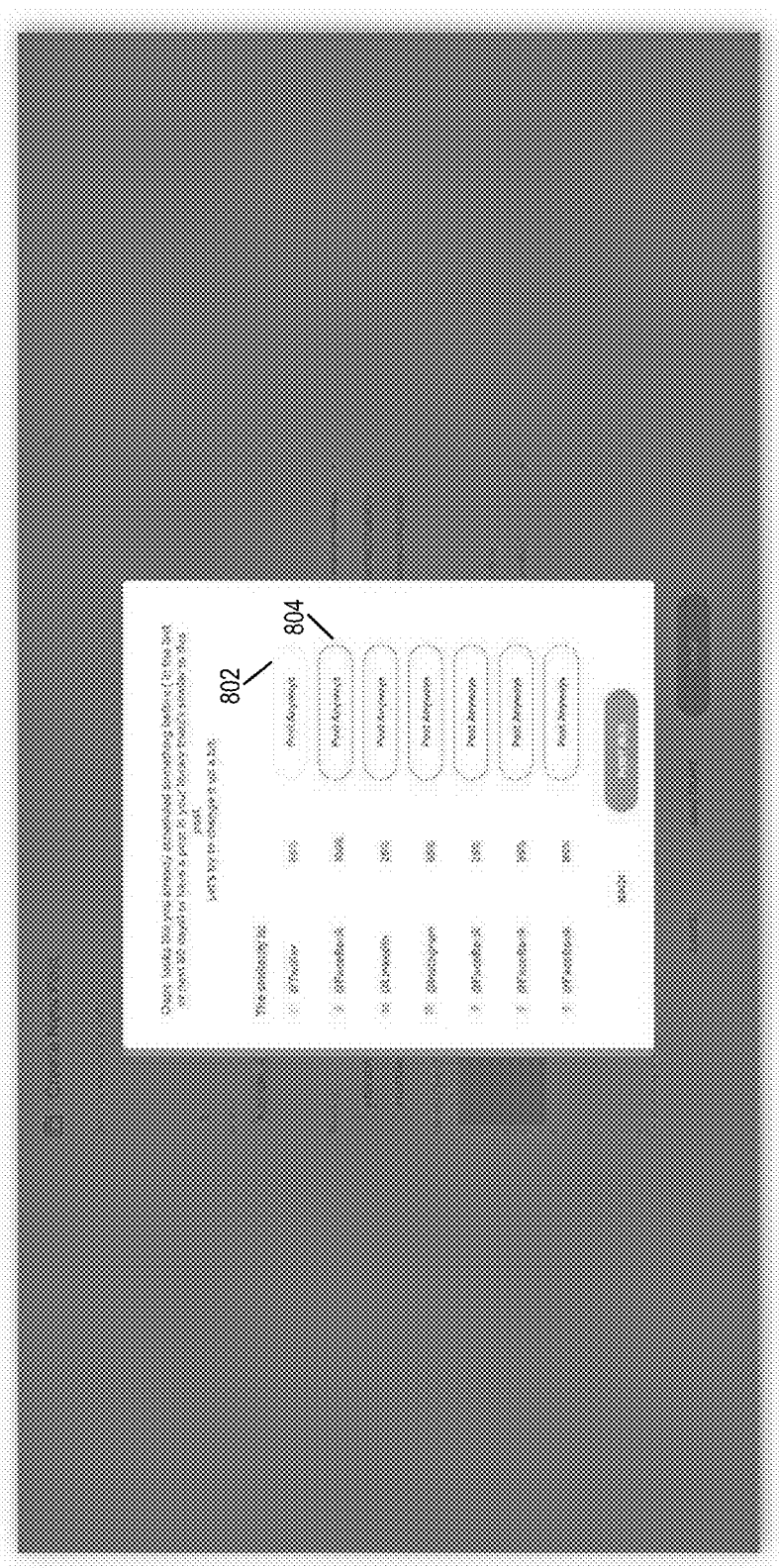
FIG. 8 illustrates an example user interface displayed by the client computing device according to an example embodiment.

FIG. 8 shows an example user interface of the content compliance engine 106 displayed by the client computing device 102 according to an example embodiment. As shown in FIG. 8, the user of the client computing device 102 may provide the draft social media post and the content compliance engine 106 may compare the draft social media post with each social media post in the library of social media posts and determine a similarity score for the draft social media post. As shown in FIG. 8, the content compliance engine 106 may provide a similarity score for one or more social media platforms and each social media account associated with the content compliance engine 106. As shown in FIG. 8, the similarity score for a first social media platform and account, @TWITTER, is 88%. The similarity score for a second social media platform and account, @FACEBOOK, is 100%. The similarity score for a third social media platform and account, @LINKEDIN, is 26%. The similarity score for a fourth social media platform and account, @INSTAGRAM, is 55%. The similarity score for a fifth social media platform and account, @FACEBOOK, is 28%. The similarity score for a sixth social media platform and account, @FACEBOOK, is 95%. The similarity score for a seventh social media platform and account, @FACEBOOK, is 85%.

As shown in FIG. 8, the user may be unable to select a publish user interface element 802 because the similarity score is deemed to be greater than a maximum allowable similarity score. In this case, the similarity score may be shown in a particular color, such as red, which indicates that the maximum allowable similarity score is greater than the maximum allowable similarity score. Other similarity scores not above the maximum allowable similarity score may be shown in another color, such as black. The publish user interface element 802 may be in a particular color, such as grey, indicating that it is not selectable. However, the user may select a publish user interface element 804 for the second social media platform and account even though the similarity score is 100%. In this case, each social media platform and account may have a different maximum allowable similarity score.

Figure 9:
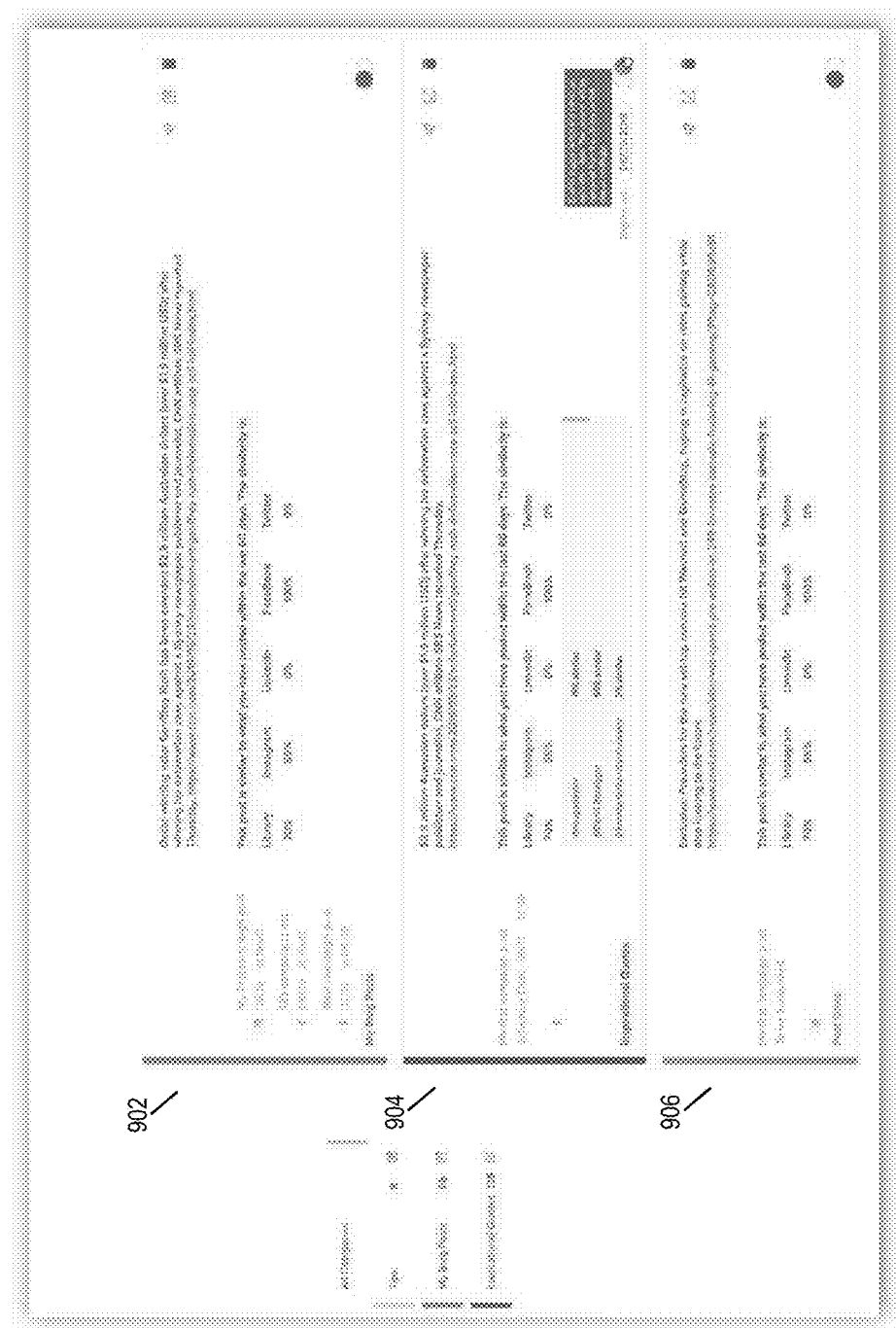
FIG. 9 illustrates an example user interface displayed by the client computing device according to an example embodiment.

FIG. 9 shows an example user interface of the content compliance engine 106 displayed by the client computing device 102 according to an example embodiment. As shown in FIG. 9, the user of the client computing device 102 may have provided a number of draft social media posts that have been published and/or are scheduled to publish. Each of the draft social media posts may be in the library of social media posts. As an example, FIG. 9 shows a first social media post 902, a second social media post 904, and a third social media post 906. As shown in FIG. 9, the first social media post 902 may have one or more similarity scores including a library similarity score of 70%, an INSTAGRAM similarity score of 55%, a LINKEDIN similarity score of 0%, a FACEBOOK similarity score of 100%, and a TWITTER similarity score of 0%. The second social media post 904 may have one or more similarity scores including a library similarity score of 70%, an INSTAGRAM similarity score of 55%, a LINKEDIN similarity score of 0%, a FACEBOOK similarity score of 100%, and a TWITTER similarity score of 0%. The third social media post 906 may have one or more similarity scores including a library similarity score of 70%, an INSTAGRAM similarity score of 55%, a LINKEDIN similarity score of 0%, a FACEBOOK similarity score of 100%, and a TWITTER similarity score of 0%.

Figure 10:
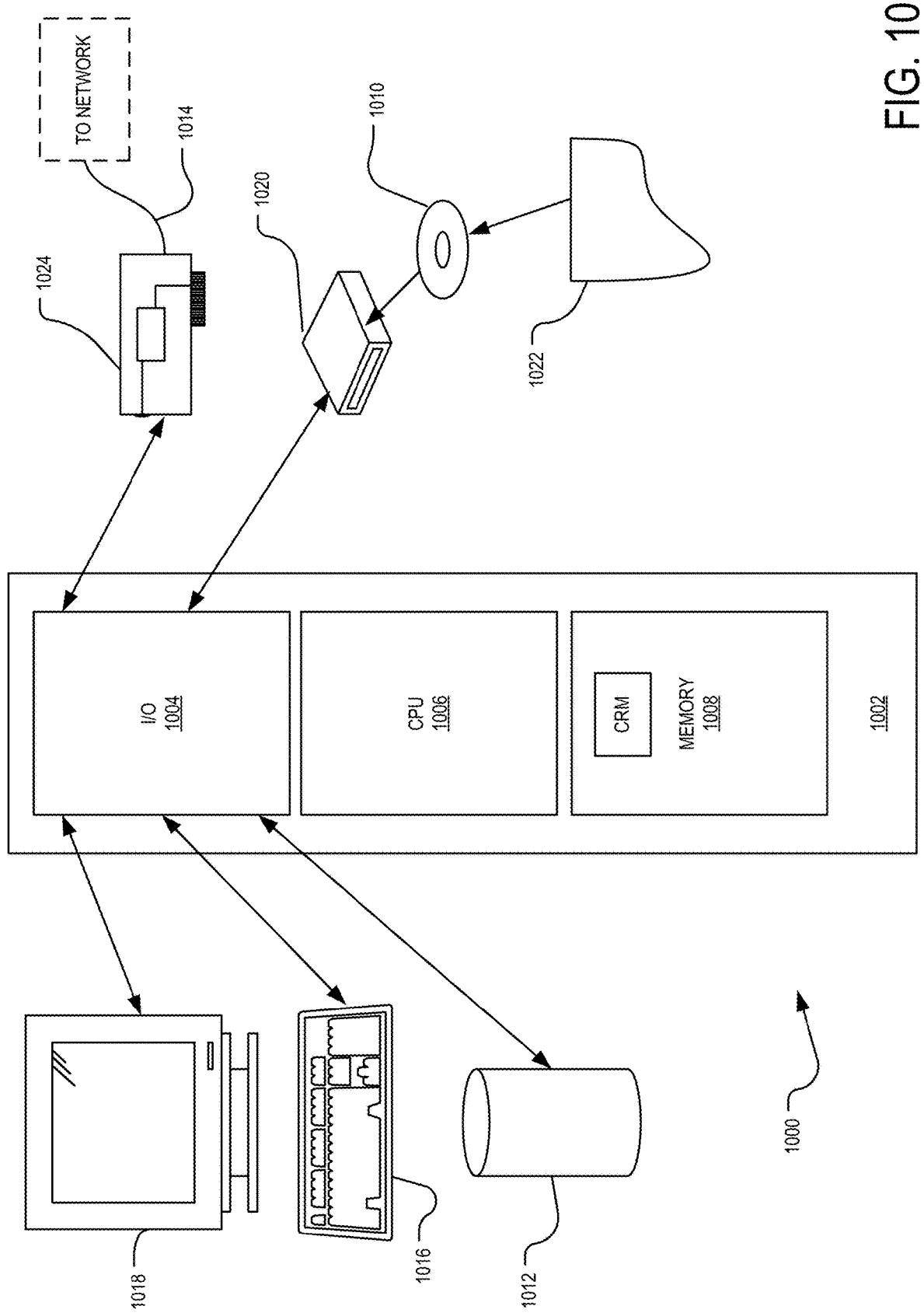
FIG. 10 illustrates a block diagram of a computing device according to an example embodiment.

FIG. 10 illustrates an example computing system 1000 that may implement various systems, such as the client computing device 102 and the server computing device 104, and the methods discussed herein, such as process 300. A general purpose computer system 1000 is capable of executing a computer program product to execute a computer process. Data and program files may be input to the computer system 1000, which reads the files and executes the programs therein such as the content compliance engine 106. Some of the elements of a general purpose computer system 1000 are shown in FIG. 10 wherein a processor 1002 is shown having an input/output (I/O) section 1004, a central processing unit (CPU) 1006, and a memory section 1008. There may be one or more processors 1002, such that the processor 1002 of the computer system 1000 comprises a single central-processing unit 1006, or a plurality of processing units, commonly referred to as a parallel processing environment. The computer system 1000 may be a conventional computer, a server, a distributed computer, or any other type of computer, such as one or more external computers made available via a cloud computing architecture. The presently described technology is optionally implemented in software devices loaded in memory 1008, stored on a configured DVD/CD-ROM 1010 or storage unit 1012, and/or communicated via a wired or wireless network link 1014, thereby transforming the computer system 1000 in FIG. 10 to a special purpose machine for implementing the described operations.

The memory section 1008 may be volatile media, non-volatile media, removable media, non-removable media, and/or other media or mediums that can be accessed by a general purpose or special purpose computing device. For example, the memory section 1008 may include non-transitory computer storage media and communication media. Non-transitory computer storage media further may include volatile, nonvolatile, removable, and/or non-removable media implemented in a method or technology for the storage (and retrieval) of information, such as computer/machine-readable/executable instructions, data and data structures, engines, program modules, and/or other data. Communication media may, for example, embody computer/machine-readable/executable, data structures, program modules, algorithms, and/or other data. The communication media may also include an information delivery technology. The communication media may include wired and/or wireless connections and technologies and be used to transmit and/or receive wired and/or wireless communications.

The I/O section 1004 is connected to one or more user-interface devices (e.g., a keyboard 1016 and a display unit 1018), a disc storage unit 1012, and a disc drive unit 1020. Generally, the disc drive unit 1020 is a DVD/CD-ROM drive unit capable of reading the DVD/CD-ROM medium 1010, which typically contains programs and data 1022. Computer program products containing mechanisms to effectuate the systems and methods in accordance with the presently described technology may reside in the memory section 1008, on a disc storage unit 1012, on the DVD/CD-ROM medium 1010 of the computer system 1000, or on external storage devices made available via a cloud computing architecture with such computer program products, including one or more database management products, web server products, application server products, and/or other additional software components. Alternatively, a disc drive unit 1020 may be replaced or supplemented by another storage medium drive unit. The network adapter 1024 is capable of connecting the computer system 1000 to a network via the network link 1014, through which the computer system can receive instructions and data. Examples of such systems include personal computers, Intel or PowerPC-based computing systems, AMD-based computing systems, ARM-based computing systems, and other systems running a Windows-based, a UNIX-based, or other operating system.

It should be understood that computing systems may also embody devices such as Personal Digital Assistants (PDAs), mobile phones, tablets or slates, multimedia consoles, gaming consoles, set top boxes, etc.

When used in a LAN-networking environment, the computer system 1000 is connected (by wired connection and/or wirelessly) to a local network through the network interface or adapter 1024, which is one type of communications device. When used in a WAN-networking environment, the computer system 1000 typically includes a modem, a network adapter, or any other type of communications device for establishing communications over the wide area network. In a networked environment, program modules depicted relative to the computer system 1000 or portions thereof, may be stored in a remote memory storage device. It is appreciated that the network connections shown are examples of communications devices for and other means of establishing a communications link between the computers may be used.

In an example implementation, source code executed by the client computing device 102, source code executed by the server computing device 104, a plurality of internal and external databases, source databases, and/or cached data on servers are stored in memory of the client computing device 102, memory of the server computing device 104, or other storage systems, such as the disk storage unit 1012 or the DVD/CD-ROM medium 1010, and/or other external storage devices made available and accessible via a network architecture. The source code executed by the client computing device 102 and the server computing device 104 may be embodied by instructions stored on such storage systems and executed by the processor 1002.

Some or all of the operations described herein may be performed by the processor 1002, which is hardware. Further, local computing systems, remote data sources and/or services, and other associated logic represent firmware, hardware, and/or software configured to control operations of the content similarity determination system 100 and/or other components. Such services may be implemented using a general purpose computer and specialized software (such as a server executing service software), a special purpose computing system and specialized software (such as a mobile device or network appliance executing service software), or other computing configurations. In addition, one or more functionalities disclosed herein may be generated by the processor 1002 and a user may interact with a Graphical User Interface (GUI) using one or more user-interface devices (e.g., the keyboard 1016, the display unit 1018, and other user-interface devices in communication with the I/O section 1004) with some of the data in use directly coming from online sources and data stores. The system set forth in FIG. 10 is but one possible example of a computer system that may be employed or be configured in accordance with aspects of the present disclosure.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon executable instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may include, but is not limited to, magnetic storage medium, optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic executable instructions.

The description above includes example systems, methods, techniques, instruction sequences, and/or computer program products that embody techniques of the present disclosure. However, it is understood that the described disclosure may be practiced without these specific details.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A system comprising:
    a memory; and
    at least one processor to:
        compare content in a draft social media post with a library of social media posts by receiving the draft social media post one character at a time in real-time, converting the draft social media post to a string of text as the draft social media post is received one character at a time in real-time, and comparing the string of text with a string of text for each social media post in the library of social media posts and determine a similarity score for the draft social media post, the library of social media posts comprising social media posts that have published in a previous sixty day period and social media posts that are scheduled to publish in a next sixty day period;
        determine whether the similarity score is less than a maximum allowable similarity score;
        send a notification that indicates that the similarity score is one of greater than or equal to the maximum allowable similarity score and less than the maximum allowable similarity score, the draft social media post and the notification displayed on a display by a graphical user interface (GUI) changing on the display in real-time as the draft social media post is received one character at a time;
        add the draft social media post to the library of social media posts when the similarity score is less than the maximum allowable similarity score; and
        publish the draft social media post to at least one social media platform when the similarity score is less than the maximum allowable similarity score.

2. The system of claim 1, wherein the maximum allowable similarity score is eighty-five percent similarity.

3. The system of claim 1, wherein the maximum allowable similarity score is one hundred percent similarity.

4. The system of claim 1, the at least one processor further to decline adding the draft social media post to the library of social media posts when the similarity score is greater than the maximum allowable similarity score, receive a modification to the content in the draft social media post from a client computing device, compare the content in the draft social media post with the library of social media posts, determine that the similarity score for the draft social media post is less than the maximum allowable similarity score, add the draft social media post to the library of social media posts, and publish the draft social media post to the at least one social media platform.

5. The system of claim 1, the at least one processor further to determine the content in the draft social media post is similar to at least one social media post in the library of social media posts that is one of scheduled to publish in a next twenty-four hour time period and has published in a previous twenty-four hour time period, decline adding the draft social media post to the library of social media posts, receive a modification to the content in the draft social media post from a client computing device, compare the content in the draft social media post with the library of social media posts, determine that the similarity score for the draft social media post is less than the maximum allowable similarity score, add the draft social media post to the library of social media posts, and publish the draft social media post to the at least one social media platform.

6. The system of claim 1, the at least one processor further to determine the content in the draft social media post is similar to at least four social media posts in the library of social media posts that is one of published in a previous seven day period and scheduled to publish in a next seven day period, decline adding the draft social media post to the library of social media posts, receive a modification to the content in the draft social media post from a client computing device, compare the content in the draft social media post with the library of social media posts, determine that the similarity score for the draft social media post is less than the maximum allowable similarity score, add the draft social media post to the library of social media posts, and publish the draft social media post to the at least one social media platform.

7. The system of claim 1, the at least one processor further to compare the content in the draft social media post with the library of social media posts that have published to a particular social media platform and determine a social media platform similarity score for the draft social media post.

8. A method comprising:
    comparing, by at least one processor, content in a draft social media post with a library of social media posts by receiving the draft social media post one character at a time in real-time, converting the draft social media post to a string of text as the draft social media post is received one character at a time in real-time, and comparing the string of text with a string of text for each social media post in the library of social media posts and determining a similarity score for the draft social media post, the library of social media posts comprising social media posts that have published in a previous sixty day period and social media posts that are scheduled to publish in a next sixty day period;

determining, by the at least one processor, whether the similarity score is less than a maximum allowable similarity score;

sending, by the at least one processor, a notification that indicates that the similarity score is one of greater than or equal to the maximum allowable similarity score and less than the maximum allowable similarity score, the draft social media post and the notification displayed on a display by a graphical user interface (GUI) changing on the display in real-time as the draft social media post is received one character at a time;

adding, by the at least one processor, the draft social media post to the library of social media posts when the similarity score is less than the maximum allowable similarity score; and publishing, by the at least one processor, the draft social media post to at least one social media platform when the similarity score is less than the maximum allowable similarity score.

9. The method of claim 8, wherein the maximum allowable similarity score is eighty-five percent similarity.

10. The method of claim 8, wherein the maximum allowable similarity score is one hundred percent similarity.

11. The method of claim 8, further comprising declining adding the draft social media post to the library of social media posts when the similarity score is greater than the maximum allowable similarity score, receiving a modification to the content in the draft social media post from a client computing device, comparing the content in the draft social media post with the library of social media posts, determining that the similarity score for the draft social media post is less than the maximum allowable similarity score, adding the draft social media post to the library of social media posts, and publishing the draft social media post to the at least one social media platform.

12. The method of claim 8, further comprising determining the content in the draft social media post is similar to at least one social media post in the library of social media posts that is one of scheduled to publish in a next twenty-four hour time period and has published in a previous twenty-four hour time period, declining adding the draft social media post to the library of social media posts, receiving a modification to the content in the draft social media post from a client computing device, comparing the content in the draft social media post with the library of social media posts, determining that the similarity score for the draft social media post is less than the maximum allowable similarity score, adding the draft social media post to the library of social media posts, and publishing the draft social media post to the at least one social media platform.

13. The method of claim 8, further comprising determining the content in the draft social media post is similar to at least four social media posts in the library of social media posts that is one of published in a previous seven day period and scheduled to publish in a next seven day period, declining adding the draft social media post to the library of social media posts, receiving a modification to the content in the draft social media post from a client computing device, comparing the content in the draft social media post with the library of social media posts, determining that the similarity score for the draft social media post is less than the maximum allowable similarity score, adding the draft social media post to the library of social media posts, and publishing the draft social media post to the at least one social media platform.

14. The method of claim 8, further comprising comparing the content in the draft social media post with the library of social media posts that have published to a particular social media platform and determining a social media platform similarity score for the draft social media post.

15. A non-transitory computer-readable storage medium, having instructions stored thereon that, when executed by a computing device cause the computing device to perform operations, the operations comprising:

comparing content in a draft social media post with a library of social media posts by receiving the draft social media post one character at a time in real-time, converting the draft social media post to a string of text as the draft social media post is received one character at a time in real-time, and comparing the string of text with a string of text for each social media post in the library of social media posts and determining a similarity score for the draft social media post, the library of social media posts comprising social media posts that have published in a previous sixty day period and social media posts that are scheduled to publish in a next sixty day period;

determining whether the similarity score is less than a maximum allowable similarity score;

sending a notification that indicates that the similarity score is one of greater than or equal to the maximum allowable similarity score and less than the maximum allowable similarity score, the draft social media post and the notification displayed on a display by a graphical user interface (GUI) changing on the display in real-time as the draft social media post is received one character at a time;

adding the draft social media post to the library of social media posts when the similarity score is less than the maximum allowable similarity score; and publishing the draft social media post to at least one social media platform when the similarity score is less than the maximum allowable similarity score.

16. The non-transitory computer-readable medium of claim 15, wherein the maximum allowable similarity score is one of eighty-five percent similarity and one hundred percent similarity.

17. The non-transitory computer-readable medium of claim 15, the operations further comprising declining adding the draft social media post to the library of social media posts when the similarity score is greater than the maximum allowable similarity score, receiving a modification to the content in the draft social media post from a client computing device, comparing the content in the draft social media post with the library of social media posts, determining that the similarity score for the draft social media post is less than the maximum allowable similarity score, adding the draft social media post to the library of social media posts, and publishing the draft social media post to the at least one social media platform.

18. The non-transitory computer-readable medium of claim 15, the operations further comprising determining the content in the draft social media post is similar to at least one social media post in the library of social media posts that is one of scheduled to publish in a next twenty-four hour time period and has published in a previous twenty-four hour time period, declining adding the draft social media post to the library of social media posts, receiving a modification to the content in the draft social media post from a client computing device, comparing the content in the draft social media post with the library of social media posts, determining that the similarity score for the draft social media post is less than the maximum allowable similarity score, adding the draft social media post to the library of social media posts, and publishing the draft social media post to the at least one social media platform.

19. The non-transitory computer-readable medium of claim 15, the operations further comprising determining the content in the draft social media post is similar to at least four social media posts in the library of social media posts that is one of published in a previous seven day period and scheduled to publish in a next seven day period, declining adding the draft social media post to the library of social media posts, receiving a modification to the content in the draft social media post from a client computing device, comparing the content in the draft social media post with the library of social media posts, determining that the similarity score for the draft social media post is less than the maximum allowable similarity score, adding the draft social media post to the library of social media posts, and publishing the draft social media post to the at least one social media platform.

20. The non-transitory computer-readable medium of claim 15, the operations further comprising comparing the content in the draft social media post with the library of social media posts that have published to a particular social media platform and determining a social media platform similarity score for the draft social media post.

* * * * *